United States Patent
Bonino et al.

(10) Patent No.: US 7,864,320 B2
(45) Date of Patent: Jan. 4, 2011

(54) METHOD TO MINIMIZE INSTRUMENT DIFFERENCES IN COLOR MANAGEMENT FUNCTIONS

(75) Inventors: Paul S. Bonino, Ontario, NY (US); Lalit Keshav Mestha, Fairport, NY (US); Gary W. Skinner, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 330 days.

(21) Appl. No.: 12/203,454

(22) Filed: Sep. 3, 2008

(65) Prior Publication Data

US 2009/0009766 A1    Jan. 8, 2009

Related U.S. Application Data

(63) Continuation-in-part of application No. 11/737,576, filed on Apr. 19, 2007, now Pat. No. 7,684,082.

(60) Provisional application No. 61/056,095, filed on May 27, 2008.

(51) Int. Cl.
*G01J 3/46* (2006.01)

(52) U.S. Cl. .................. 356/402; 702/196; 702/182; 356/408

(58) Field of Classification Search .......... 356/402, 356/425, 319, 408; 702/196, 182, 198; 358/504, 358/523
See application file for complete search history.

(56) References Cited

U.S. PATENT DOCUMENTS

| | | | |
|---|---|---|---|
| 4,553,033 A | 11/1985 | Hubble | |
| 6,384,918 B1 | 5/2002 | Hubble, III et al. | |
| 6,556,932 B1 | 4/2003 | Mestha et al. | |
| 6,584,435 B2 | 6/2003 | Mestha et al. | |
| 6,587,793 B2 | 7/2003 | Viassolo et al. | |
| 6,721,692 B2 | 4/2004 | Mestha et al. | |
| 6,934,053 B1 | 8/2005 | Mestha et al. | |
| 6,975,949 B2 | 12/2005 | Mestha et al. | |
| 7,259,853 B2 | 8/2007 | Hubble, III et al. | |

(Continued)

OTHER PUBLICATIONS

U.S. Appl. No. 11/737,576, filed Apr. 19, 2007, Mestha, et al.

(Continued)

*Primary Examiner*—L. G Lauchman
(74) *Attorney, Agent, or Firm*—Fay Sharpe LLP

(57) ABSTRACT

A method for estimating color measurements of color samples includes printing a color sample based on input data, measuring a color of the printed color sample with an in-line spectral sensor at a first temperature, and estimating a color of the printed color sample which would be output by a reference spectral sensor at a second temperature. The estimation is based on a thermochromatic model which represents relationships between measured colors of printed color samples on the in-line spectral sensor at the first temperature and the reference spectral sensor at the second temperature. The reference spectral sensor is a different type of sensor from the in-line spectral sensor, so the color response of the two spectral sensors is different, even when the measurement conditions are identical. Consequently, a set of printed spot color samples generate different measured colors at the second temperature on the in-line spectral sensor from the reference spectral sensor. The exemplary method allows these differences, as well as measurement temperature differences to be accounted for in the estimation.

21 Claims, 9 Drawing Sheets

U.S. PATENT DOCUMENTS

| | | |
|---|---|---|
| 7,271,910 B2 | 9/2007 | Paul et al. |
| 7,277,196 B2 | 10/2007 | Van de Capelle et al. |
| 7,333,208 B2 | 2/2008 | Mestha et al. |
| 2006/0152718 A1 | 7/2006 | Mestha et al. |
| 2006/0244968 A1 | 11/2006 | Mestha et al. |

OTHER PUBLICATIONS

U.S. Appl. No. 12/017,746, filed Jan. 22, 2008, Mestha, et al.

U.S. Appl. No. 12/127,643, filed May 27, 2008, Mestha, et al.

U.S. Appl. No. 12/127,649, filed May 27, 2008, Mestha, et al.

U.S. Appl. No. 12/127,719, filed May 27, 2008, Gil, et al.

U.S. Appl. No. 61/056,090, filed May 27, 2008, Skinner, et al.

U.S. Appl. No. 61/056,095, filed May 27, 2008, Bonino, et al.

U.S. Appl. No. 61/056,102, filed May 27, 2008, Mestha.

U.S. Appl. No. 61/056,189, filed May 27, 2008, Mestha, et al.

http://www.adobe.com/print/events/pdf/Hayhurst.pdf, Jan. 22, 2006.

METHOD TO MINIMIZE INSTRUMENT DIFFERENCES IN COLOR MANAGEMENT FUNCTIONS

This application claims the priority of U.S. Provisional Application Ser. No. 61/056,095, filed May 27, 2008, the disclosure of which is incorporated herein in its entirety by reference and claims the benefit, as a continuation-in-part, of U.S. application Ser. No. 11/737,576 filed Apr. 19, 2007, entitled METHOD AND SYSTEM FOR COMPENSATING FOR THERMOCHROMATICITY DIFFERENCES IN INLINE SPECTROPHOTOMETERS, by Mestha, et al., the disclosures of which are incorporated herein in their entireties by reference.

CROSS REFERENCE TO RELATED PATENTS AND APPLICATIONS

The following copending applications, the disclosures of which are incorporated in their entireties by reference, are mentioned:

U.S. patent application Ser. No. 12/017,746, filed Jan. 22, 2008, entitled METHOD AND APPARATUS FOR OPTIMUM BLACK COMPONENT DETERMINATION FOR GRAY COMPONENT REPLACEMENT, by Mestha, et al.;

U.S. patent application Ser. No. 12/127,643, filed May 27, 2008, entitled METHOD, APPARATUS AND SYSTEMS TO RETRIEVE GCRS FROM HISTORICAL DATABASE, by Mestha, et al.;

U.S. Provisional Application Ser. No. 61/056,189, filed May 27, 2008, entitled IMAGE INDEXED RENDERING OF IMAGES FOR TUNING IMAGES FROM SINGLE OR MULTIPLE PRINT ENGINES, by Mestha, et al.;

U.S. Provisional Application Ser. No. 61/056,102, filed May 27, 2008, and U.S. patent application Ser. No. 12/194,602, filed Aug. 20, 2008, both entitled UV ENHANCED FULL WIDTH ARRAY SCANNING SPECTROPHOTOMETER, by Mestha;

U.S. Provisional Application Ser. No. 61/056,090, filed May 27, 2008, entitled METHOD FOR CONDITIONAL APPLICATION OF COLOR MEASUREMENT ERROR COMPENSATION IN SPECTRAL SENSORS, by Skinner, et al.;

U.S. patent application Ser. No. 12/127,719, filed May 27, 2008, entitled COOPERATIVE NEIGHBOR PRINTING SYSTEM PROFILE METHODS AND SYSTEMS, by Gil, et al.; and U.S. patent application Ser. No. 12/127,649, filed May 27, 2008, entitled A WEB ENABLED COLOR MANAGEMENT SERVICE AND METHOD, by Mestha, et al.

BACKGROUND

The exemplary embodiment relates to the color management arts. It finds particular application in connection with a system and method for minimizing differences in color measurements from different instruments.

For the printing industry, many "off the shelf" spectrophotometers are available to perform color measurements. Numerous illumination-viewing geometries (e.g., 0/45, 45/0, integrated sphere) are available. The various devices may differ in speed of measurement, illumination size, illumination spectrum, detection resolution, chromatic sensitivity, and the like. Because of these differences, different devices differ in their spectral measurements with various media and colorants. Examples of physical properties that may affect the measurements include gloss, fluorescence, texture, motion of media, and media backing. Currently, the physical properties of the print media have to be narrowly specified in order for the color to be measured accurately to well within perceptual differences and to be repeatable by different instruments.

Recently developed color management applications often make use of an in-line spectrophotometer or similar color measurement device. Examples include tone reproduction curves (TRCs) generated using data from an in-line spectrophotometer during a color calibration routine. They are also used for accurate spot color matching, in which a specified spot color is to be printed by a process color device. For example, spot colors may be defined using the Pantone Matching System, Pantone GoE colors, user defined spot colors, or the like. Other applications include performing color check routines and generating accurate multidimensional custom ICC (International Color Consortium) profile look up tables (LUTs). The custom ICC profiling function lets the customer select a paper stock to profile and automatically print, measure, and generate the color profiles needed for various halftone screens. After generating the profiles, the customer can then proceed immediately into production, with the corrections applied, and receive more accurate output with minimal adjustments so that the output emulates the industry color standards, such as GRACoL, ISO, SWOP, and Japan Color.

Because color measurement devices have different responses, those applications which require accurate and repeatable color measurements are often referenced to some "golden measurement standard" device. Each color standard may specify a particular device (such as an X-Rite iSis or DTP70 Autoscan spectrophotometer) that is to be used to generate the reference target (aim) measurements. For example, in the Pantone Matching System, the device independent targets supplied by Pantone, Inc., are measured by their standard instrument, an iSis spectrophotometer. The source aim in the CMYK path that meets GRACoL® standards is a SWOP® CMYK to L*a*b* LUT, which is developed on an offset press using measurements from an X-Rite DTP70 sensor.

Some of the existing problems with color matching could be minimized if the industry were to adopt a common instrument as the standard for performing measurements. Even if this were to happen, however, it is not likely to be cost effective to put such devices into the print path of a printing system for regular calibration purposes. Hence, to provide good color matching to meet the customer's expectations, differences in instruments in the aim measurements need to be accounted for.

In-line spectrophotometers have been found to give different measurements when testing just-fused sheets from those when the printed sheets have been cooled. Mathematical methods have been developed to correct for these thermochromatic errors so that the in-line device can provide an estimate of the measurement which that spectrophotometer would provide at the ambient temperature at which the customer will perceive the printed colors. One method involves building a thermochromaticity compensation matrix that relates the thermochromatically shifted (hot) colors to thermochromatically stable (cool) colors. This matrix is then applied as a signal processing function to subsequent in-line color measurements, thus producing a final spectral measurement that closely approximates the stable (cool) color.

INCORPORATION BY REFERENCE

The following references, the disclosures of which are incorporated herein in their entireties by reference, are mentioned:

U.S. application Ser. No. 11/737,576, filed Apr. 19, 2007, entitled Method and System for Compensating for THERMOCHROMATICITY DIFFERENCES IN INLINE SPECTROPHOTOMETERS, by Mestha, et al., discloses a method for color measurement of a color output device. Output colors of the device vary in color during a time of cooling from a just-fused temperature to an ambient temperature. The variance in color is represented by a thermochromatic model. The method includes measuring in situ color of a print output of the color output device at a first temperature, converting the measured in situ color to a corresponding output ambient color from the thermochromatic model, and using the converted desired output ambient color as a basis for assessing operability of the color output device.

U.S. Pub. No. 20060244968, published Nov. 2, 2006, entitled METHOD TO AUTOMATICALLY IDENTIFY AND COMPENSATE FOR SUBSTRATE DIFFERENCES USING A SENSOR, by Mestha, et al., discloses a method of calculating the degree of similarity between the test media substrate and pre-characterized substrates stored in a broad media database by using from the sensor measurements some measured media attributes (e.g., spectral reflectance of the substrate, special characteristics such as media fluorescence, other non-color-related attributes such as surface roughness, weight, thickness, gloss, etc.).

U.S. Pat. No. 6,934,053, issued Aug. 23, 2005 to Mestha, et al., entitled METHODS FOR PRODUCING DEVICE AND ILLUMINATION INDEPENDENT COLOR REPRODUCTION, describes a method for obtaining spectrally matched color outputs using data from a real-time sensor, such as, for example, a spectrophotometer on the output trays of a marking device.

U.S. Pat. No. 6,721,692, entitled SYSTEMS AND METHODS FOR DETERMINING SPECTRA USING DYNAMIC LEAST SQUARES ALGORITHMS WITH MEASUREMENTS FROM LED COLOR SENSOR, by Mestha, et al., discloses a method of determining a reflectance spectrum. The method includes obtaining a normalized value from a plurality of illuminant sensor outputs, each illuminant sensor output indicating a reflectance value obtained from a target. Reference data is obtained from a reference database that correlates reference spectra with a corresponding plurality of normalized illuminant sensor outputs for reference colors. The reference data includes data in a neighborhood of each reflectance value. A spectrum S is determined, based on the illuminant sensor outputs and the reference data which places greater importance on the data in the neighborhood of each reflectance value.

U.S. Pat. No. 6,384,918, entitled SPECTROPHOTOMETER FOR COLOR PRINTER COLOR CONTROL WITH DISPLACEMENT INSENSITIVE OPTICS, by Hubble, III et al., discloses a color correction system for a color printer in which a spectrophotometer is mounted in the output path of a printer for sensing the colors of a test patch printed on a test sheet. A sequential actuation circuit sequentially illuminates the test patch with different illumination colors. The spectrophotometer is mounted at one side of the printer output path and has a lens arrangement allowing it to be substantial insensitive to variations in a displacement between the spectrophotometer and the test sheets.

U.S. Pat. No. 6,975,949, entitled FULL WIDTH ARRAY SCANNING SPECTROPHOTOMETER, by Mestha, et al., discloses a full width array spectrophotometer for full width scanning color analysis of a printed print media sheet. The spectrophotometer includes linear arrays of LEDS in a repeating pattern to span the paper path and a corresponding parallel array of photodetectors to receive light reflected from a transverse illuminated band extending transversely across a print media sheet moving in the paper path.

U.S. Pat. No. 7,333,208, entitled FULL WIDTH ARRAY MECHANICALLY TUNABLE SPECTROPHOTOMETER, discloses a method of full transverse scanning color analysis of color printed sheets moving in a color printer path with a full width array spectrophotometer.

U.S. Pat. No. 7,271,910, entitled SYSTEMS AND METHODS FOR COMPENSATING FOR TEMPERATURE INDUCED SPECTRAL EMISSION VARIATIONS IN LED BASED COLOR PARAMETER MEASURING DEVICES, discloses a method of determining color parameter values for sensors using a reference database containing different model information for different temperatures. The method includes determining an appropriate model for the operating temperature and the outputs of the sensor and determining color parameter values based on the determined model.

U.S. Pat. No. 7,259,853, entitled SYSTEMS AND METHODS FOR AUGMENTING SPECTRAL RANGE OF AN LED SPECTROPHOTOMETER, by F. F. Hubble III, et al., discloses an LED spectrophotometer device for determining an aspect of the color of an object. The device includes a visible spectrophotometer comprising a plurality of light emitting diodes that emit light in the visible spectrum onto the object. At least one detector detects the light after being directed onto the object and for generating an output. A UV light emitting diode assembly emits light in the near ultraviolet spectrum and communicates with at least one detector for generating an output. A mechanism blocks light outside of a preselected visible blue spectral range from being detected by the detector of the UV light emitting diode assembly.

U.S. Pub. No. 2006/0152718, entitled SYSTEMS AND METHODS FOR SELECTING A REFERENCE DATABASE FOR DETERMINING A SPECTRUM OF AN OBJECT BASED ON FLUORESCENCE OF THE OBJECT, by L. K. Mestha, et al., discloses a method of determining a reflectance spectrum, which includes predicting a degree of fluorescence of an object prior to determining a reflectance spectrum of the object. The method includes selecting a most appropriate reference database from among a plurality of reference databases based on the predicted degree of fluorescence of the object, each of the reflectance databases indicating a reflectance spectra of a set of reference colors and corresponding sensor outputs, determining a reflectance spectrum of the object using the most appropriate database, and using the determined reflectance spectrum to determine the output of a coloring device.

BRIEF DESCRIPTION

In accordance with one aspect of the exemplary embodiment, a method for estimating color measurements of color samples includes printing a color sample based on input data, measuring a color of the printed color sample with an in-line spectral sensor at a first temperature, estimating a color of the printed color sample which would be output by a reference spectral sensor at a second temperature, the estimation being based on a thermochromatic model which represents relationships between measured colors of printed color samples on the in-line spectral sensor at the first temperature and the reference spectral sensor at the second temperature, the reference spectral sensor being a different type of sensor from the in-line spectral sensor such that a set of printed spot color samples generate different measured colors at the second temperature on the in-line spectral sensor from the reference spectral sensor.

In accordance with another aspect of the exemplary embodiment, a thermochromaticity compensation system includes an in-line spectral sensor and memory which stores a thermochromatic model which represents relationships between measured colors of printed color samples on the in-line spectral sensor at the first temperature and a reference spectral sensor at the second temperature, the reference spectral sensor being a different type of sensor from the inline spectral sensor such that a set of printed spot color samples generate different measured colors at the second temperature on the inline spectral sensor from the reference spectral sensor A processor receives measured colors of a printed color sample from the inline spectral sensor at a first temperature and, accesses the model to estimate a color of the printed color sample which would be output by the reference spectral sensor at a second temperature.

In accordance with another aspect of the exemplary embodiment, an algorithmic method to compensate for thermochromaticity errors of in situ spectral color measurements of a color printing device includes obtaining spectral measurements of a printed color generated by the color printing device measured at a first temperature by an in-line spectrophotometer and an off-line reference spectrophotometer at a second temperature, generating a model which maps the difference between the spectral measurements of the printed color generated by the color printing device measured at a first temperature by the in-line spectrophotometer and the off-line reference spectrophotometer at the second temperature, and measuring a selected color corresponding to a color input signal representing a desired color at the second temperature, wherein the selected color is measured at the first temperature by the in-line spectrophotometer. The method further includes applying the model to convert the measured color to a corresponding color when the measured color changes to the second temperature, if measured on the off-line reference spectral sensor and assessing if the color is different from an expected color intended by the color input signal.

DETAILED DESCRIPTION

Figure 1:
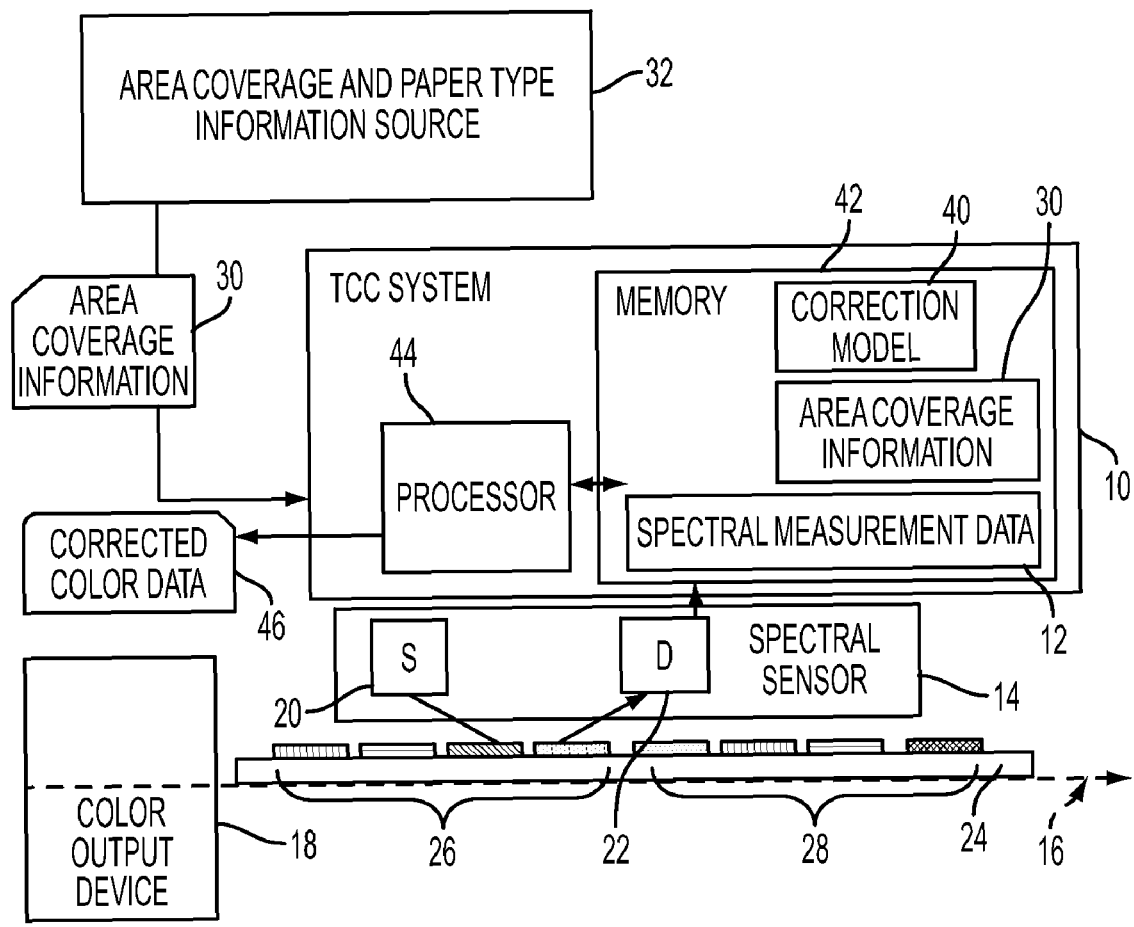
FIG. 1 is a functional block diagram of an exemplary thermochromaticity correction system in accordance with one aspect of the exemplary embodiment.

Aspects of the exemplary embodiment relate to a system and method for color compensation which finds application in automated printer calibration and other color management applications. The color compensation allows a correction to be applied to measurements made with a first spectral sensor, such as an in-line spectrophotometer, so that the corrected measurements more closely emulate measurements which would be made on a second spectral sensor, such as a golden measurement standard instrument, e.g., an X-Rite iSis or X-Rite DTP70 Autoscan spectrophotometer.

The exemplary system and method allow the first spectral sensor measurements to be corrected for both differences in the way in which the two sensors perceive colors and also the differences in the conditions under which the measurements are made. Thermochromaticity correction, as used herein, implies a correction which is applied to account for thermochromatic material properties, in particular, the shift in toner colors as a function of temperature.

U.S. application Ser. No. 11/737,576 discloses a system and method which includes sensing reflectance values with an in-line spectral sensor and correcting the values by applying a global thermochromaticity correction. According to aspects illustrated therein, there is provided an algorithmic method to compensate for thermochromatic differences in in situ spectral color measurement systems within a color printed device. A mapping model is made from empirical data comprising the differences between spectral measurements of a printed color generated by the color printing device at a first temperature and a second temperature. The spectrophotometric sensor measures a generated color at an embedded location where the measurement occurs at about the first temperature. The mapping determines what color will result when the temperature cools to the ambient or second temperature. System performance is then assessed, based on the predicted, map-determined cool color.

In the present embodiment, a system as disclosed in application Ser. No. 11/737,576 may be adapted to predicting the colors of a different type of spectrophotometer from the one used in the measurements. Additionally, the correction system may account for other differences, such as media backing and type of media. Additionally, in some embodiments, rather than applying a global correction to the first sensor's measurements, the system and method factors area coverage into the thermochromaticity correction and thus apply a non-uniform correction to the sensed reflectance values.

In the exemplary spectrophotometric color measurement system, disclosed herein, a first spectral sensor, such as an in-line spectrophotometer, which may be positioned in the output path of a color output device, measures colors under a first set of conditions to obtain a first set of color measurements, such as reflectance measurements, voltage signals, or the like. For the first set of conditions, the first spectral sensor may make color measurements at a first temperature, typically hot, at a "just-fused" location in the output path of a color printer. A correction (TCC) system relates the measured colors to output colors of a second spectral sensor. In the exemplary embodiment, the output colors from the TCC emulate those of the second spectral sensor under a second set of conditions, e.g., at a second temperature, e.g., a cooled ambient temperature. The second set of conditions optionally also include using different media and/or media backing from those used for the first measurements. The measured color from the first spectral sensor is converted via a thermochromatic model. The model optionally takes into account area coverage, to generate what is expected for the measured color in response to a particular input signal, thereby providing a real time conversion to the anticipated output color when cooled to the ambient temperature. Printer operability can be assessed by verifying predicted color accuracy or by adjusting the input signal to compensate for a measured difference between the anticipated output color and an actually measured ambient temperature color.

The second spectral sensor is different in type from the first spectral sensor, i.e., even under identical measurement conditions, gives a different set of color measurements for the same printed sheets on which a set of spot colors are laid down. This would yield perceptible differences in color if either system were to be set to print color patches meeting the two different measurements. In the exemplary embodiment, the second spectral sensor is one which is the specified type for making color measurements in a particular spot color system, such as Pantone, and may be, for example, an X-Rite iSis or DTP70 Autoscan spectrophotometer. The reference spectral sensor is generally an off-line sensor, i.e., is not in the output path of the color output device.

The exemplary in-line spectral sensor may be mechanically integrated (embedded) into the paper path of a color output device, such as a color printer or copier, and is therefore capable of measuring color on paper immediately after printing, i.e., before the paper leaves the printing device. The in-line spectral sensor may be positioned in the output path of the color output device intermediate a marking engine which generates a printed color sample to be measured and a finisher of the color output device, downstream of the marking engine and connected thereto by a paper path. An in-line spectrophotometer which may be used as the first spectral sensor in the present system is generally a high speed color-measuring device that illuminates a color sample of interest with a light source, measures light reflected from the sample, and interprets the results as a reflectance spectrum across a specific range of wavelengths. An exemplary in-line spectrophotometer which may be used is a full width array (FWA) spectrophotometer as described in U.S. Pat. No. 6,975,949, the disclosure of which is incorporated herein in its entirety, by reference.

The color samples tested may be test patches, i.e., generated by separately printing a set of different, predefined colors in small localizable regions of the print media. In other embodiments, the samples tested may be customer images or selected regions thereof.

In one embodiment, the applied correction is based, in part, on area coverage. It is postulated that areas of high toner coverage do not cool as quickly as areas of lower toner coverage. Thus, it is expected that a high area coverage sample will be at a higher temperature, at the time it is seen by the in-line spectrophotometer, than a lower area coverage sample. It has been found experimentally that area coverage does impact the measurement data. By factoring in the area coverage, the applied thermochromaticity corrections can more accurately compensate for these differences.

The area coverage is a way of expressing the density of toner on the sample being tested. It may be expressed, for example as a function of the pixel colorant values of the color separations which are to be applied. Thus for example, in a cyan, magenta, yellow and black system (CMYK, i.e., four color separations) pixel colorant values for each color separation are typically expressed in the range of 0-255, where 255 represents 100%. These colorant values may be normalized, for convenience, to a scale of 0-1. An area coverage can then be computed as a function of the four colorant values, e.g., as an (optionally weighted) sum, for a fixed area of the test sample. For example, when colorant values of C, M, and Y are each 127 (50%) and K is 0, these first three values may each be normalized to 0.5 and a computed area coverage may be their sum, i.e., 1.5. The computed area coverage can then be used in generating thermochromaticity corrections. In general, the effect on the thermochromaticity correction will be different for a first area coverage (high density) than for a second area coverage (low density) which is lower than the first area coverage. This is because the variation between the measured hot and cool colors is generally higher as the area coverage increases.

The problem occurs because the same output color (as measured by the second spectral sensor on the cooled color sample) can be created with different levels of toner coverage. Thus, for example, a color generated when colorant values of C, M, and Y are each 127 (50%), may be very similar to the color generated when C, M, and Y are each 255 (100%).

In various aspects, the exemplary method includes building a mathematical model which relates thermochromatically shifted (hot) colors measured on the first spectral sensor to corresponding thermo-chromatically stable (cool) colors measured on the second spectral sensor. The model can then be used to correct subsequent sensed colors.

With reference to FIG. 1, a block diagram of an exemplary TCC system 10 is shown in an operating environment. System 10 receives, as input, color measurement data 12 from a first spectral sensor 14, such as an in-line spectrophotometer. The spectral sensor 14 is positioned closely adjacent to the output paper path 16 of a color output device 18, such as a printer or copier, and includes an illumination source S 20 or more typically, a set of sources, and a photodetector D 22, or set of photodetectors. Exemplary sources 20 and photodetectors 22 may be arranged in one or more linear arrays, generally in a cross process direction, i.e., perpendicular to the paper path 16, as described, for example, in U.S. Pat. No. 6,975,949. Print media 24 is conveyed on the paper path 16 in the direction shown and passes by the sensor 14, where it is illuminated. Sets of color samples 26, 28, printed on the print media 24 by the color device, at high and low area coverage, respectively, pass by the sources 20 and detectors 22 as the sheets 24 are conveyed along the path 16. The sources illuminate the samples and reflected light is sensed as reflectance measurements at a plurality of wavelengths ("hot" measurements).

The TCC system 10 optionally further receives, as input, area coverage information 30 from a source 32 of area coverage information, such as the digital front end (DFE) of the color output device. The DFE may also provide paper type information to the system 10. Alternatively, the area coverage of the patches can be estimated using a system as described in U.S. Pat. No. 4,553,033, issued Nov. 12, 1985 to Hubble, entitled INFRARED REFLECTANCE DENSITOMETER, which provides an electrical signal representative of the amount of toner particles on the photosensitive surface of the color output device.

The TCC system 10 includes a thermochromaticity correction model 40. The model 40, along with the color measurement data 12 and area coverage information 30, may be stored in memory 42. A processor 44, having access to the memory 42, inputs the acquired color measurement data 12 and area coverage information to the model 40 to generate corrected color data 46 (estimated "cool" measurements), which is output from the system 10. The TCC system 10 may thus execute instructions which, for each of a set of color samples, e.g., test patches, determine a correction which is based on estimated measurement differences between the first spectral sensor 14 and a second spectral sensor, and is optionally also based on the area coverage information 30 and print media type for that particular sample. The system 10 further executes instructions for applying the appropriate correction to the hot measurements.

In one embodiment, the area coverage information 30 may be used to identify an appropriate matrix in the model 40 to be applied to the color measurement data 12 which bests fits the area coverage or used as an input to a multidimensional model in which area coverage is a factor. Where print media is also/alternatively a considered factor, the matrix selected may be one appropriate for correcting for differences in print media.

Figure 2:
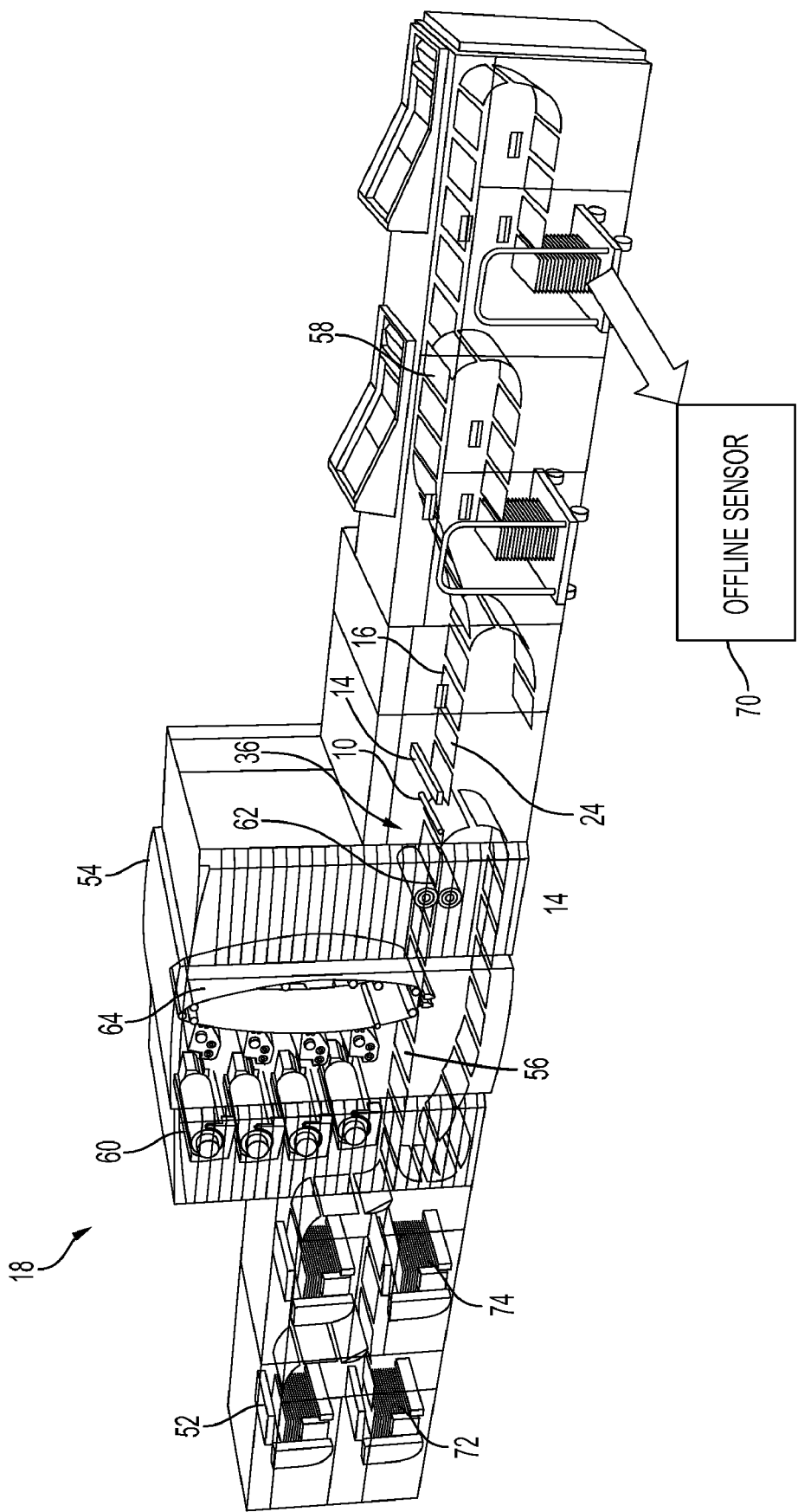
FIG. 2 is an exemplary embodiment of a printing system including an embedded spectrophotometer in accordance with another aspect of the exemplary embodiment.

To illustrate the exemplary spectrophotometric color measurement system 10 in situ, FIG. 2 shows an exemplary color output device 18 in the form of a digital color printing device. Printer 18 includes a source 52 of paper or other print media substrate 24, such as a paper feeder. The feeder 52 is connected to a marking engine 54, by a paper path 56, which includes output path 16 and which connects the marking engine 54 with a finisher 58. As illustrated, the marking engine 54 is a multi-color engine having a plurality of imaging/development subsystems 60, that are suitable for producing individual color images (e.g., with four color separations CMYK) on a photoreceptor 64 in the form of a belt. The belt then transfers the images to the print media substrate 24, here shown as sheets of paper. The first spectral sensor 14, such as a full-width array (FWA) scan bar, measures color values of test patches, either on the belt 64 or on the paper 24. To generate the model 40, the measured color reflectivities of a set of test patches, e.g., about 300 or 1000 printed color test patches, are then spatially mapped to corresponding corrected color values measured on the cool (e.g., ambient) test patches by a second spectral sensor 70 and are input to the model 40. Thereafter, the system 10 can, in real-time, spectrophotometrically measure non-ambient temperature colors, yet maintain accurate ambient color outputs. Printed sheets passing the spectral sensor 14 are conveyed along the paper path 16 to the finisher 58 downstream of the marking engine 54.

While the printing system 18 is described as having four color separations (C, M, Y, and K), it is to be appreciated that fewer or more color separations may be employed in printing the test patches 26, 28, such as 2, 3, 6, or more color separations. Additionally, while the color output device 18 is shown as having a single in-line sensor 14, it is also contemplated that the color output device 18 may include two or more marking engines in series and/or in parallel, each with its own in-line spectral sensor 14 in the output path. In alternate embodiments, two or more marking engines may have a common output path 16 in which a common sensor is located.

The spectral sensor 14 may output the color values in any convenient color space, such as L*, a*, b*, XYZ, or the like, depending on the desired color description. One suitable spectrophotometer 14 is disclosed in U.S. Pat. No. 6,384,918, the disclosure of which is hereby incorporated by reference.

The spectrophotometer disclosed therein is suited to non-contact measurement of colored target areas such as test patches on moving printed test sheets in an output path of a color printer, where test patches may be sequentially angularly illuminated with multiple different colors, and a photosensor providing electrical signals in response. The spectrophotometer includes a lens system for transmitting the reflected illumination (from multiple illumination sources, such as approximately eight or more individual LEDs) from the test patch to the detector. The exemplary spectrophotometer provides non-contact color measurements of moving color target areas variably displaced therefrom within normal paper-path baffle spacings.

Paper feeder 52 may include two or more types of print media. In the exemplary embodiment, the paper feeder has paper trays or the like from which a first print media 72 and a second print media 74 can be selectively sent to the marking engine 54 for printing color samples 26, 28. The first print media 72 may have a first color and/or gloss and second print media 74 may have a second, different, color and/or gloss, or other different characteristic. The differences in characteristic(s) are such that measurements on the color samples 26, 28 that are made on the first and/or second spectral sensor 14, 70 differ, depending on which media is used. Thus, for example, the second spectral sensor 70 (or first spectral sensor 14) may give a first set of measurements for a set of test samples if the test samples are printed on the first print media 72 and a different set of measurements if the samples are printed on the second set of print media 74. In general, a particular print media 72 is specified for the second sensor measurements, which may be designated paper type 1. A customer may specify a spot color which is defined for paper type 1, but request that it be printed on the second print media 74, paper type 2. The printer thus wishes to be sure that when the job is printed on the second print media 74, the color matches that which would be measured on the first print media 72. The exemplary model allows such differences to be modeled.

Figure 3:
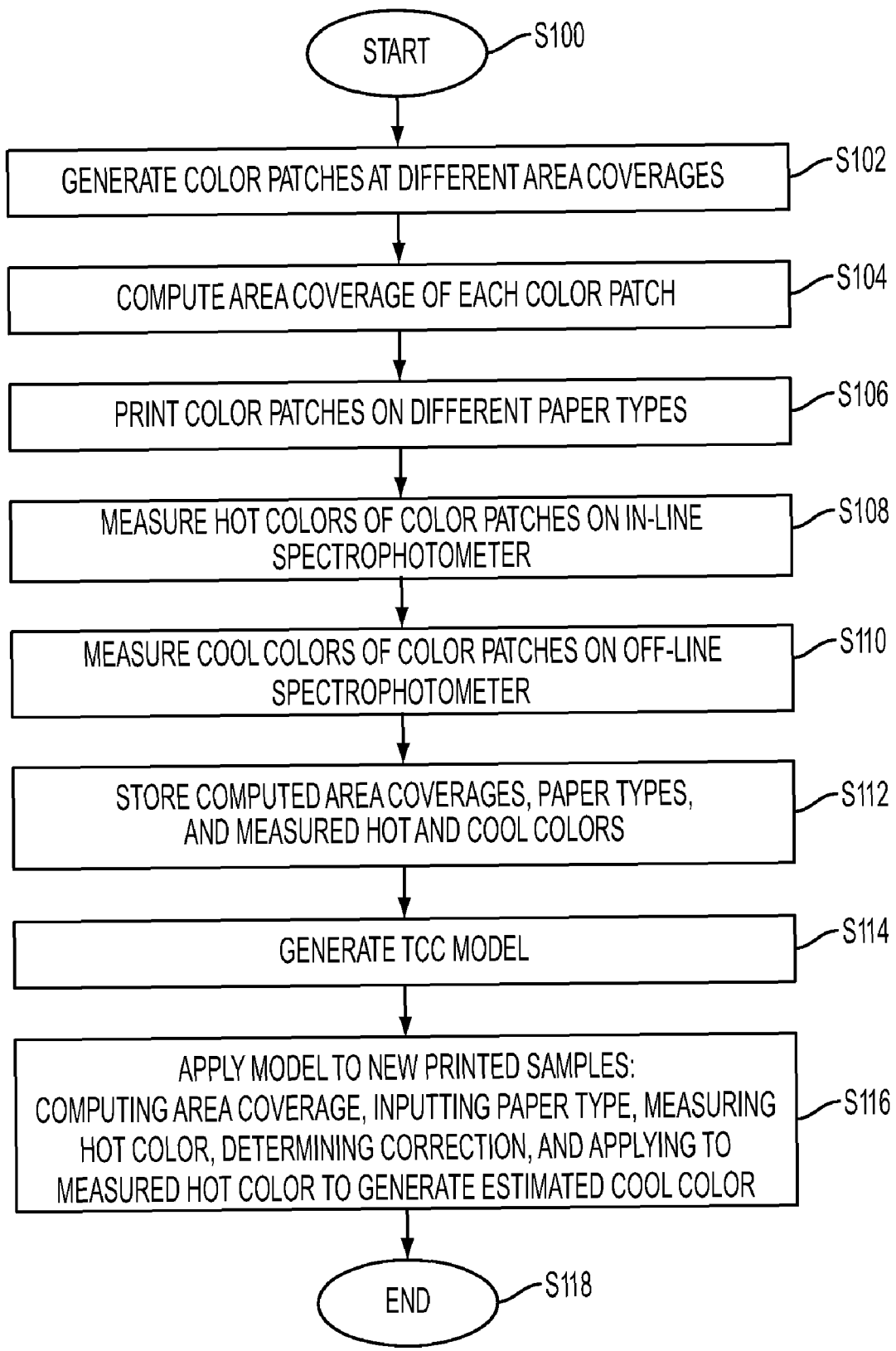
FIG. 3 is a flowchart illustrating a method of correction of in-line color measurements in accordance with another aspect of the exemplary embodiment.

FIG. 3 illustrates an exemplary method for generating a model and for applying the model for correction of in-line color measurements. The method begins at S100. At S102, color patches are generated. For example, a set of color patches representing the total color space of interest is generated (e.g., each patch is defined in terms of pixel values for each of the color separations utilized by the device) at high and low area coverages.

At S104, an area coverage of each of the patches is computed.

At S106, the color patches 26, 28 are printed on a first print media type 72 and optionally on a second print media type 74 (or more than two different types of print media).

At S108, "hot" measurements on the color patches 26, 28 are made. A first set of in situ measurement data is this acquired at a first (hot) temperature using the first spectral sensor 14. The hot temperature of the patches is representative of the temperatures to be expected during normal operation of the color output device.

At S110, "cool" measurements on the same patches are made. For example, the finished prints are collected, cooled and measured again after the color has stabilized, at a second (cool) temperature. The second set of measurement data (cool) are made with the second spectral sensor 70. The temperature selected for the second set (cool) measurements is generally around ambient temperature, such as about 20-25° C., e.g., 22° C.

At S112, the hot and cool measurements for the two (or more) media types and area coverage information may be stored in a training database.

At S114, the first and second sets of measurement data and computed area coverage are used to create the thermochromaticity compensation (TCC) model 40. The model may be in the form of a multi-dimensional matrix or a set of compensation matrices. This completes the generation of the model. Once the model has been developed it can be used in a color compensation method (S116).

At S116, the model 40 can then be applied as a signal processing function to subsequent in-line ("hot") color measurements on printed media, thus producing a final spectral measurement that closely approximates the stable (cool) color. The method ends at S118.

Figure 4:
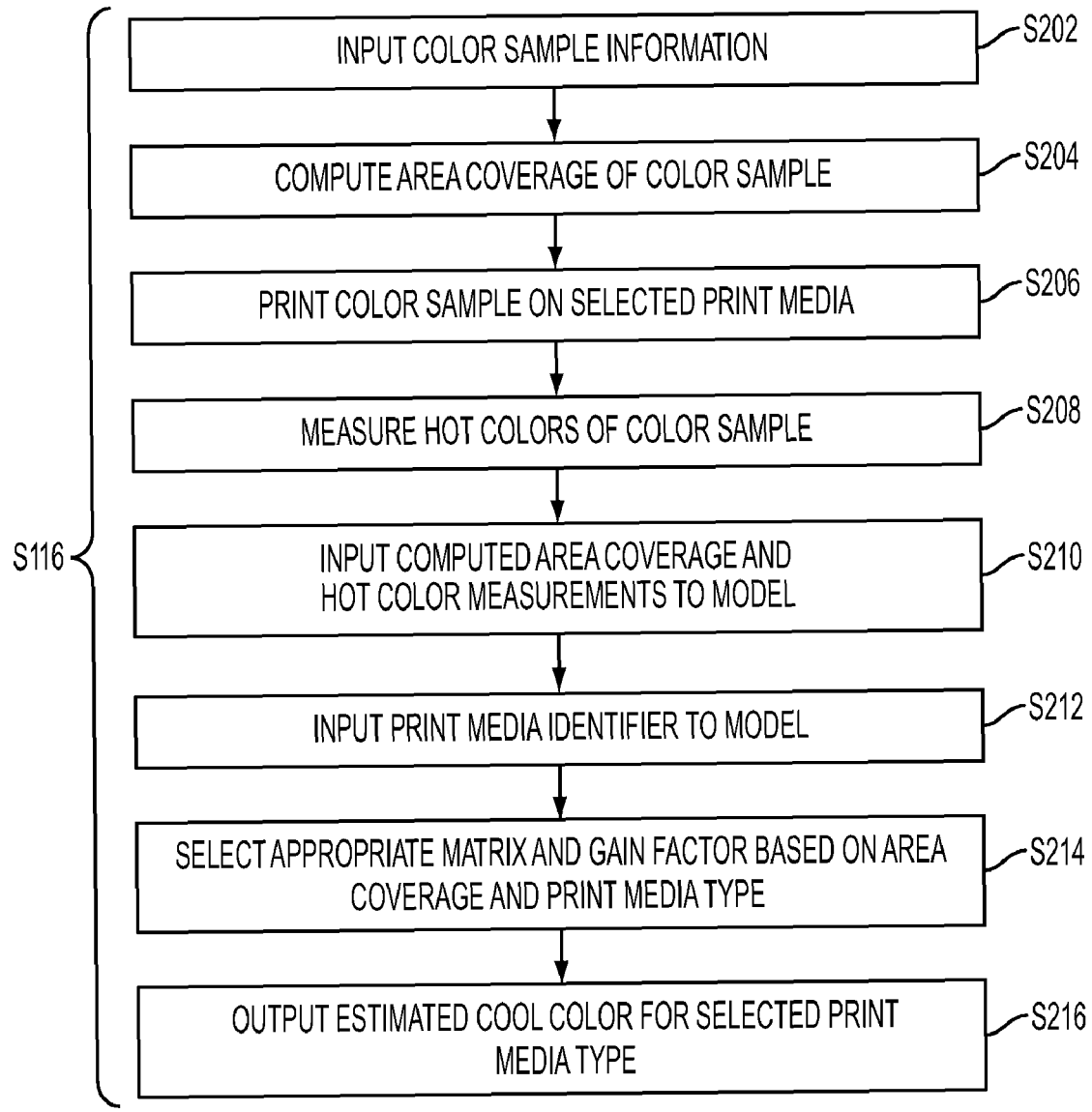
FIG. 4 illustrates substeps of the exemplary method of FIG. 3, for applying a model.

FIG. 4 illustrates substeps of the exemplary method which may be performed in S116. Step S116 may include inputting color information to the model 40 for a color sample to be printed, which may be a test patch or a portion of a customer image (S202). This step may include processor 44 automatically acquiring the CMYK information for the sample from the DFE 32 of the printer.

At S204, an area coverage of the sample is optionally computed from the input CMYK information by processor 44.

At S206, the sample is printed on a selected print media.

At S208, the hot color of the printed sample is measured with the first spectral sensor 14, in the manner previously described.

At S210, the hot color measurements and area coverage information is input to the model 40, e.g. by the processor 44.

At S212, a print media type is optionally input to the model 40. For example, the information on the print media selected and/or print media to be emulated is automatically acquired from the DFE 32 and input to the model by the processor 44. For example, each print media type is associated with an identifier which is input to the model.

At S214, an appropriate matrix from those previously generated at S114 is automatically selected, based on the input information. In one embodiment, a gain factor is selected which is applied to the matrix. The gain factor adjusts the matrix for the computed area coverage and/or print media type, as described in greater detail below.

At S216, the model 40 applies the selected, optionally gain weighted, matrix to the color measurements and outputs an estimated cool color of the printed sample on the same or different print media as it would be measured by the second spectral sensor. The estimated color of the printed color sample (at the second temperature on the second spectral sensor and with selected print media) may be used as a basis for assessing operability of a color output device which printed the color sample.

Step S116 of the method illustrated in FIGS. 3 and 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary processor 44 and method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the method of compensating measured hot colors for thermochromaticity errors.

Once the TCC model 40 has been built, steps S102 to S116 may be repeated at intervals to recalibrate the model.

Although the phrase "thermochromaticity" is commonly used to refer specifically to chromatic shift occurring in color pigments with change in temperature, in the present application, the errors between the measurements taken at a "just-fused" location within the output device, and when the print output had an opportunity to cool to ambient temperature are broadly grouped under the term "thermochromaticity error." For example, there may be shift in lightness component (i.e., L*) of the color occurring when glossy images are cooled. Such kinds of shifts occurring due to change in temperature are all grouped as "thermochromaticity" errors.

Figure 5:
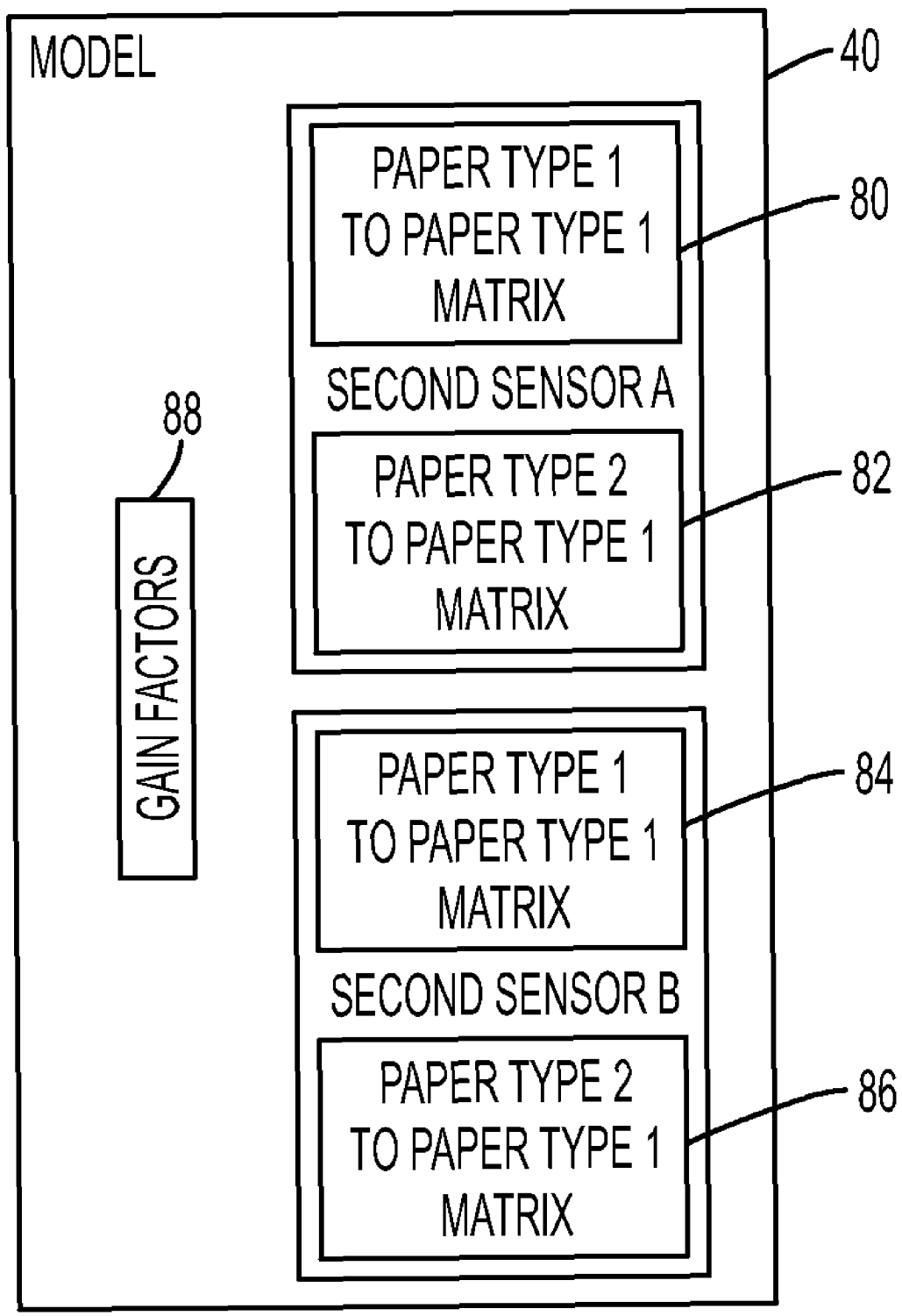
FIG. 5 is a block diagram of an exemplary model in accordance with another aspect of the exemplary embodiment.

FIG. 5 illustrates an exemplary model 40. The model includes a set of matrices, algorithms, or the like, which are selectively applied, based on the inputs. For example, the matrices may include a first matrix 80 which is used when the print media (or print backing) is the same as that specified in a spot color for the reference device 70 and at least a second matrix 82 which is used when the print media is different. Where there are two or more reference devices 70 that the printer operator may wish to match, a second set of matrices 84, 86 may be provided for the second reference device (sensor B). A set 88 of gain factors may also be stored in the model 40 which is applied to the selected matrix to weight the matrix, depending on the computed area coverage. In other embodiments, multi dimensional matrices are provided which allow one or more of print media type, backing type, and area coverage, to be considered as additional factors. Additionally, where a printer includes two or more marking engines under the control of a common control system 32, the TCC model 40 may store two (or more) sets of matrices and gain factors, one for each marking engine.

The exemplary TCC model 40 may be built using the training database containing the acquired "hot" and "cool" color measurements obtained in step S108 and S110. In one embodiment, a simple weighted least squares algorithm may be used for generating each of the TCC matrices or multi-dimensional matrix. Construction and application of the matrix to various regions of the color space based on area coverage information enables a nonlinear correction to be applied to the color measurements by selective use of a single TCC matrix or multiple TCC matrices. Three exemplary methods for accounting for area coverage are described in further detail below, which include a simple binary method and more complex methods.

The exemplary system 10 with the thus developed model 40 emulates the instrument differences between the in-line sensor 14 and the reference instrument 70, by creating estimated measurements that resemble the measurements which could be expected if the tests were performed at ambient temperature by the reference instrument 70, as each color patch is measured. The system 10 may be located in the digital front end 32 of the color output device 18 or remote from the color output device and linked thereto, e.g., via a wired or wireless connection, such as a LAN, WLAN, or the Internet. The exemplary algorithm employed by the system 10 is intended to eliminate any color measurement variation between the "hot" color patches measured by the in-line spectrophotometer 14 which is located directly after the fuser, and those same patches measured at room temperature by the same spectrophotometer and also differences between the measured colors and those which would be expected from the reference spectrophotometer 70, which may be a Golden Measurement Standard instrument (such as an iSis, or DTP70 spectrophotometer or any other reference spectrophotometer) and the in-line spectrometer when measuring Pantone or other specified colors. It will be appreciated that the system may not provide an exact match.

The exemplary embodiment also permits different correction matrices to be applied for different aims in situ, thus extending the TCC correction method to other color management applications. For example, since the Pantone Matching System uses an iSis spectrophotometer as the industry standard instrument, the correction matrix obtained using that instrument 70 may be used as one matrix (or set of matrices). While in the same color output device 18, when customers are required to match images to GRACoL standards, a DTP70 based correction matrix can be applied to the measurements, thus alleviating the instrument differences automatically.

The exemplary embodiment applies software-based correction to instrument differences. Hence, the approach can offer lower cost, improved quality, provide easy (or remote) upgrades and faster turnaround time and other advantages.

The system 10 and method also find application in printing environments which have multiple, non-similar measurement systems. It offers a correction that adjusts the output to correlate between spectrophotometers with bounded instrument-to-instrument variability.

The three methods for generating the model 40 will now be described. An algorithm which can be adapted to all three methods is described below.

Method 1: A Binary Conditional Compensation Approach

In this approach, the compensation matrix applied at high area coverage is different from that applied at low area coverage. For example, a first compensation matrix $M_L$ is applied when the computed area coverage parameter is below a threshold value and a second, different compensation matrix $M_H$ is applied when the computed area coverage is at or above the threshold value. An appropriate threshold can be determined empirically. In one embodiment, the first compensation matrix $M_L$ applies no compensation for thermochromaticity, although it may apply a correction for sensor differences and print media differences.

Experimental data may be used to identify a suitable threshold. Above the threshold, it is considered favorable to apply the second matrix $M_H$. Applications utilizing color measurement data could conditionally apply the second thermochromaticity compensation algorithm based on whether the requested color patch, whose CMYK values are known, falls above or below this density threshold.

If no thermochromaticity compensation is desired, the matrix can simply reflect the differences between the two spectral sensors 14, 70 and any differences in print media.

In one embodiment, the method described in application Ser. No. 11/737,576 may be used for generating the matrix or matrices $M_L$, $M_H$.

Figure 6:
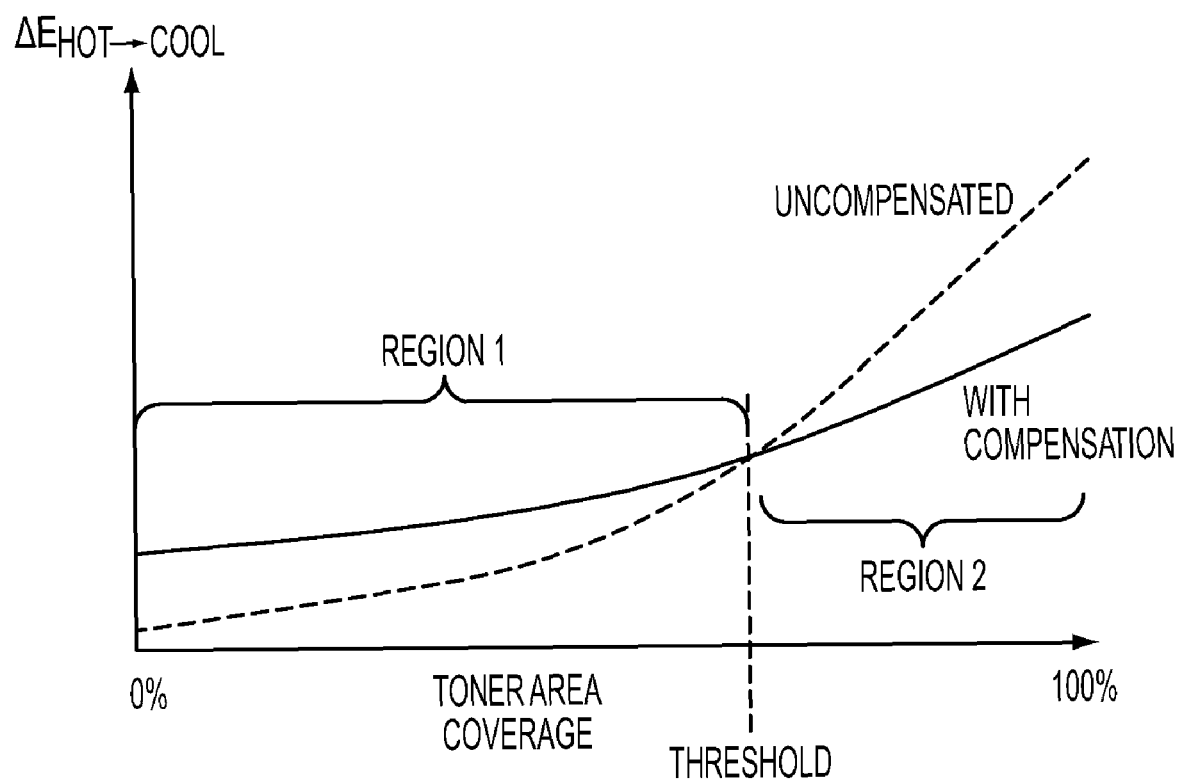
FIG. 6 illustrates a binary conditional correction scheme which may be employed in the method of FIG. 3 in accordance with another aspect of the exemplary embodiment.

FIG. 6 schematically illustrates a plot of ΔE(hot→cool) vs. area coverage (expressed on a scale of 0-100%). ΔE(hot→cool) represents the empirically determined error when the hot measurements are converted to corresponding cool measurements. The curve labeled "uncompensated" shows the ΔE(hot→cool) without applying a thermochromaticity correction. As it can be seen in this plot, the errors are quite low when the area coverage is low but rise as area coverage increases. The "with compensation" plot shows the errors when a chromaticity correction algorithm of the type described in application Ser. No. 11/737,576 is applied. As can be seen, the error is slightly higher than when no compensation is applied when the area coverage is low. At higher area coverage, the "with compensation" plot shows lower errors than for the uncompensated plot. Method 1 of the exemplary embodiment therefore may define the threshold at or about the point at which the ΔE(hot→cool) "with compensation" plot equals the "uncompensated" ΔE(hot→cool) (the intersection of the two plots). In region 1, which includes all area coverages below the threshold, no thermochromaticity correction is applied. In region 2, which includes all area coverages above the threshold, the thermochromaticity correction algorithm is applied. The expected error, in method 1, is thus reduced in each region.

In this embodiment, a single TCC Matrix Q can be based on the hot and cool data from a color patch set which has a complete spread of toner area coverage (TAC) patches using an algorithm as described below, in which all weights are set to unity. The TCC Matrix is applied only to measurements of color patches that exceed the TAC threshold (region 2). No TCC is applied to measurements of patches that fall below TAC threshold (region 1). Thus for example, for test patches illustrated in FIG. 1, the low area coverage patches 28 may receive a different (or no) thermochromaticity correction from high area coverage patches 26 in the matrices $M_L$ and $M_H$. Thus, for example, in the embodiment of FIG. 5, the model 40 may include an $M_L$ and an $M_H$ matrix for each of matrices 80, 82, 84, 86 and the gain factors 88 are not required.

Method 2: A Region Based Conditional Compensation Approach

In a second method, a set of regions are defined, based on area coverage, and the patch to be corrected is assigned to the most appropriate area coverage region. A thermochromaticity correction for that region is then applied by the model.

Figure 7:
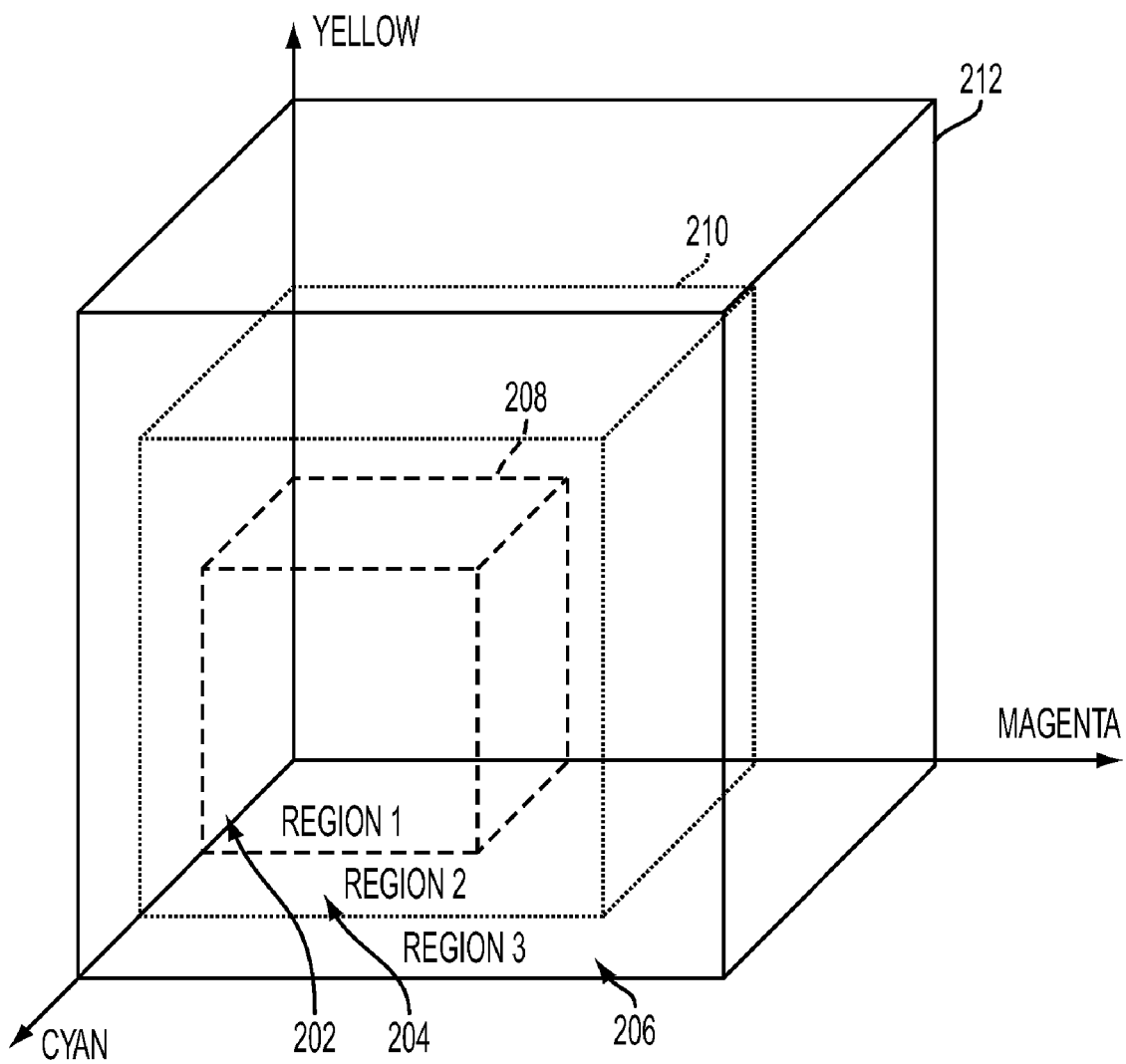
FIG. 7 illustrates a region based conditional thermo-chromaticity compensation scheme which may be employed in the method of FIG. 3 in accordance with another aspect of the exemplary embodiment.

For example, the color space for the color separations employed in the printing device (e.g., CMYK) is divided into a number of regions as a function of toner density (computed area coverage). FIG. 7 illustrates, by way of example, three regions 202, 204, 206 for three color separations CMY, for ease of illustration. Region 1 covers C, M, and Y values at the lower end of the toner density scale. Region 2 extends from a boundary 208 with region 1 to a boundary 210 with region 3, i.e., a mid region of toner densities, and Region 3 extends from the boundary 210 to the maximum values of the toner densities illustrated by boundary 212. While the three regions are illustrated as having boundaries 208, 210 which are cubic (equal density for each separation), it is to be appreciated that the boundaries between the regions 202, 204, 206 may assume other shapes. Additionally, any number of regions may be defined, such as 3, 4, 5, 6, 10, or more. Additionally, any number of color separations can be considered, such as 3, 4, 5, 6, or more.

In one embodiment, a cluster based approach may be used to cluster combinations of C, M, Y area coverage values (and optionally K or other colorants) into different regions. Then, when a new sample is to be assigned to one of the regions, the Euclidian distance between the new sample values and the nearest CMY point(s) in three (or more) dimensional space is determined. The region in which the point with the minimum Euclidian distance from the new sample point is located is assigned to the new sample.

For example, if a point in a three dimensional space represents 0.3 Y, 0.3 C, 0.3 M and is assigned to Region 1, and another point with coordinates 0.4 C, 0.4 Y and 0.2 M is assigned to Region 2, then a point which is (0.4 C, 0.4 Y, 0.0 M) is assigned to a region, based on respective Euclidian distances to the two (or more) points already assigned to a region.

Once the regions are defined, a thermochromaticity compensation matrix Q1, Q2, Q3 can be created for each coverage region 202, 204, 206, etc. The number of training samples, N, used in the TCC matrix creation for each region 202, 204, 206 can be different (i.e., N=N1 for region 1, N=N2 for region 2, etc.). For example, compensation matrix Q1 is created for light patches (region 1), Q2 for mid-density patches (region 2), and Q3 for dark patches (region 3). When new patches are to be compensated, the relevant matrix applicable to each patch that falls within that area coverage region is applied. When processing color measurement data, the TCC system identifies the requested color patch in terms of its density region, and then utilizes the corresponding thermo-chromaticity compensation matrix.

Thus for example, in the embodiment of FIG. 5, each matrix 80, 82, 84, 86 may each comprise three or more, region based matrices Q1, Q2, Q3.

The generalized algorithm for constructing the matrices is given below. Several weighting schemes are proposed for applying this algorithm to method 2. In one embodiment, fixed weights are used for each region. In another embodiment, variable weights based on distance may be employed. The weights may vary as a function of wavelength.

Method 3: Gain Weighted Thermochromaticity Compensation Method

In this method, a gain function 88 is applied to a global compensation matrix Q. The matrix Q can be similar that created for region 2 in method 1. The gain can be a function of area coverage, e.g., patch halftone dot density. This gain function is applied to the thermochromaticity compensation matrix, for example, by multiplying the matrix by the appropriate gain. The gain function may be in the form of an equation or lookup table that is experimentally determined. For the low densities (low computed area coverage) the gain may be near or equal to zero so that the thermo-chromaticity compensation is hardly applied. For higher densities, the gain approaches a maximum value, e.g., 1, so that the thermochromaticity compensation output by the compensation matrix is entirely applied.

In this embodiment, a single matrix can be created for the entire training set. As for method 2, several approaches for weights in the algorithm below exist. In one embodiment, a single weight is used for the entire training set. In other embodiment, variable weights, which may be based on wavelengths can be easily incorporated, depending on a desire to emphasize visually important colors.

For new samples, the selected matrix Q (such as matrix 80, 82, 84, or 86) is multiplied by a gain that is a function of halftone dot density (computed area coverage) and the correction output by the matrix is applied to the hot measurements.

Figure 8:
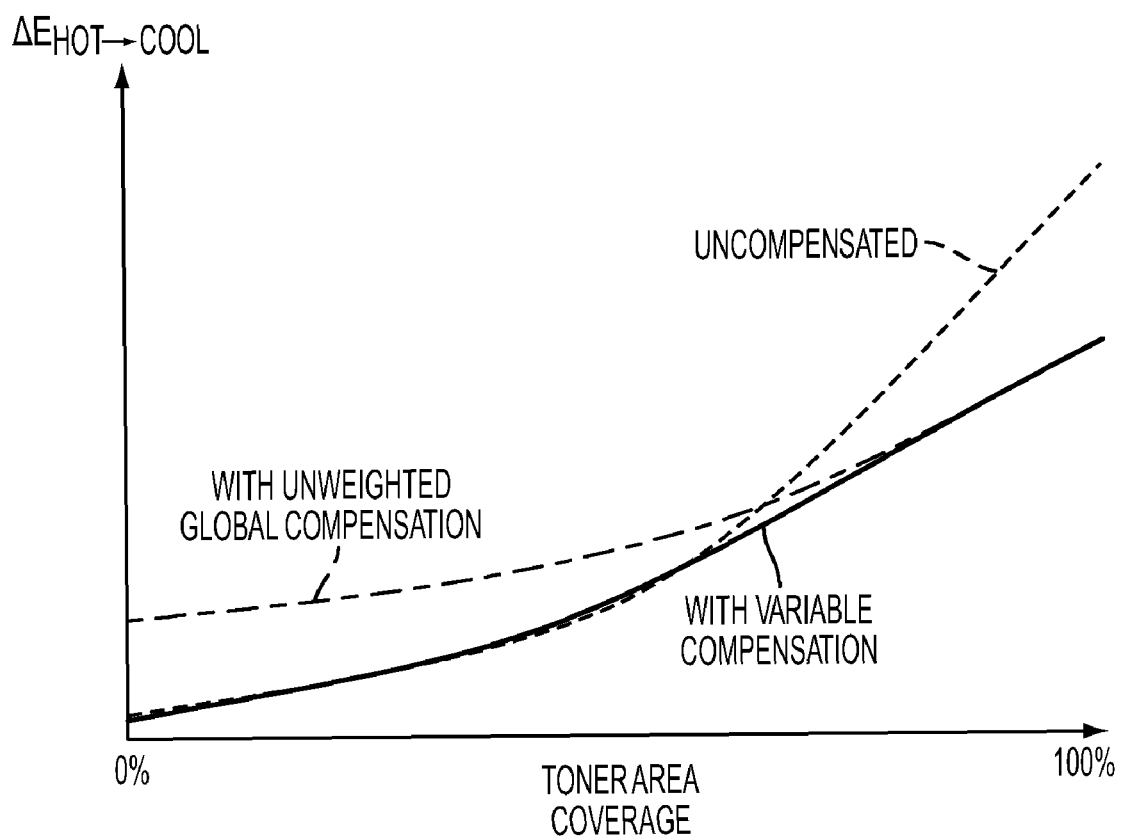
FIG. 8 illustrates a gain weighted thermochromaticity compensation method which may be employed in the method of FIG. 3 in accordance with another aspect of the exemplary embodiment.

FIG. 8 illustrates the effect of applying a gain weighted (variable compensation) of the type described in method 3 upon ΔE(hot→cool). As can be seen, the variable compensation plot provides a relatively low ΔE(hot→cool) throughout the range of area coverage by applying a linear gain to the global matrix.

Figure 9:
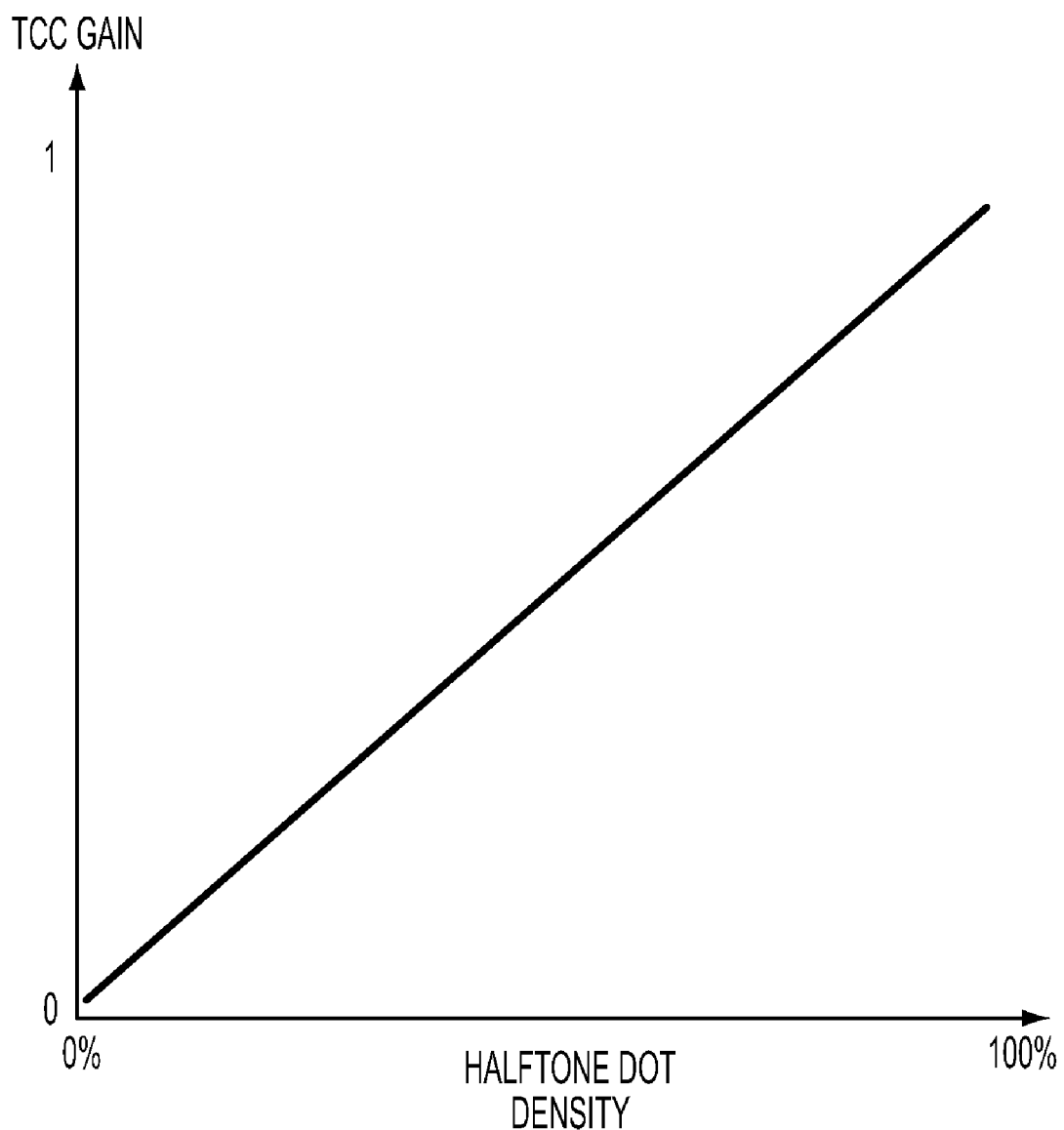
FIG. 9 illustrates an exemplary linear gain function in accordance with another aspect of the exemplary embodiment.

FIG. 9 illustrates an exemplary gain function 88 which may be applied in this method. The exemplary function is a linear function, which is dependent on the halftone dot density. As will be appreciated, the gain function may be non linear, e.g., exponential, stepped, or the like.

Weighted Least Squares Algorithm

The algorithm used to generate the TCC matrix (such as matrix 80, 82, 84, 86 or a combined matrix) uses as input the hot and cool measurements stored in the database. The thermochromaticity matrix may be in the form of a transfer function or a look up table as a mapping from hot reflectance spectra (measured spectra of hot colors) to cool reflectance spectra (measured spectra of the same color samples after they are cooled to room temperature) using the same spectrophotometer or a different type of spectrophotometer.

The algorithm may be applied as follows. Let N represent a number of training spectral pairs. Each spectral pair corresponds to a test color sample as represented below in equation 1), which are available in the database, i.e., N represents the total number of thermochromaticity test colors (e.g., N is 2000). The object is to find the transformation Ω which describes the relationship between the cool measurements S and hot measurements R.

$$S = [\, S_1 \quad S_2 \quad \ldots \quad S_N \,] \in R^{n \times N} \overset{\Omega}{\rightarrow} R = [\, R_1 \quad R_2 \quad \ldots \quad R_N \,] \in R^{n \times N}, \quad \text{(Eqn. 1)}$$

where $S_1 \, S_2 \ldots S_N$ are the vectors of the N cool spectral samples and $R_1 \, R_2 \ldots R_N$ are the corresponding vector elements for the hot spectral samples. Each vector includes n elements corresponding to spectral measurements (e.g., reflectance measurements, voltages, or other signals) at different wavelengths for the sample. For example, if the sensor includes an array of 31 LEDs (or other illumination sources), each having a respective peak wavelength, and the sensor separately measures reflectance for each of these sources to obtain 31 measurements, then n=31.

Assuming a linear, quadratic, or cubic affine, or the like for the relationship between the cool and hot training set, then a general expression for estimated cool spectral samples can be defined as follows:

$$S = QR \quad \text{(Eqn. 2)}$$

In the present example, R is a 31×1 element vector for a linear model. The matrix Q, which is the TCC matrix, has a size 31×31. If an affine term is required, then the hot spectral colors are augmented with a scalar value of 1 to include the affine term. The resulting Q matrix will then be of size 31×32. If quadratic and cubic terms are added, then number of elements in vector R will correspondingly increase. To compute matrix Q accurately, a weighted error minimization in spectral space may be performed using a least squares minimization procedure. Matrix Q is then obtained by minimizing the objective function defined as:

$$J = \arg\min_Q \sum_{i=1}^{N} w_i(\lambda) \| S_i(\lambda) - Q R_i(\lambda) \|^2 \quad \text{(Eqn. 3)}$$

where $w_i(\lambda)$ is weight, such as a wavelength dependent weight, or a fixed weight, e.g., 1.

$S_i(\lambda)$ represents the vectors of the N cool spectral samples $R_i(\lambda)$ represents the corresponding vectors for the hot spectral samples The weight or weights $w_i(\lambda)$ can be chosen based on one of the following criteria:

(a) Fixed Weights $w_i(\lambda)=1$ or any other suitable fixed weight chosen for all colors $I=1, \ldots, N$.

(b) Weights Based on the Euclidian Distance of the Color/Between Colors

The weight $w_i(\lambda)$ may be proportional to $$\frac{1}{d_i^x},$$

wherein $d_i$ is the Euclidean distance between colors (for any number of color separations) and x is the number of color separations, e.g., 4. Euclidean distance is also referred to as the L2-Norm of two vectors.

The solution to the above optimization problem can be easily obtained by setting the gradient of J with respect to Q equal to zero. This results in:

$$Q=AP^{-1} \quad \text{(Eqn. 4)}$$

where $$A = \sum_{i=1}^{N} w_i(\lambda) S_i R_i^T, \text{ and } P = \sum_{i=1}^{N} w_i(\lambda) R_i R_i^T \quad \text{(Eqn. 5)}$$

and T represents the transpose of the vector.

Once Q is computed, the estimated cool spectrum $\hat{S}$ of the target color measured by the sensor 14 is obtained by:

$$\hat{S}=QR \quad \text{(Eqn. 6)}$$

where R is as previously defined, for the new color sample.

As will be appreciated, the same algorithm can be adapted for each of the three methods described above. In method 1, the weight $w_i(\lambda)$ is set to 1 and the algorithm used to compute a single matrix for use when a sample is classified in region 2. For method 1, therefore, the matrix Q can thus be obtained by minimizing the objective function defined as:

$$J = \arg\min_Q \sum_{i=1}^{N} 1\|S_i(\lambda) - QR_i(\lambda)\|^2 \text{ and}$$

$$Q = \sum_{i=1}^{N} S_i R_i^T \left( \sum_{i=1}^{N} R_i R_i^T \right)^{-1}$$

In methods 2 and 3, different weights $w_i(\lambda)$ can be used, i.e., $$Q = \sum_{i=1}^{N} w_i(\lambda) S_i R_i^T \left( \sum_{i=1}^{N} w_i(\lambda) R_i R_i^T \right)^{-1}$$

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for estimating color measurements of color samples: comprising:

printing a color sample based on input data;

measuring a color of the printed color sample with an in-line spectral sensor at a first temperature;

estimating a color of the printed color sample which would be output by a reference spectral sensor at a second temperature, the estimation being based on a thermochromatic model which represents relationships between measured colors of printed color samples on the in-line spectral sensor at the first temperature and the reference spectral sensor at the second temperature, the reference spectral sensor being a different type of sensor from the in-line spectral sensor such that a set of printed spot color samples generate different measured colors at the second temperature on the in-line spectral sensor from the reference spectral sensor.

2. The method of claim 1, wherein the measuring of the color of the printed color sample at the first temperature includes measuring the color of the just-fused printed sample with the in-line spectral sensor.

3. The method of claim 1, wherein the measuring of the color of the printed color sample at the first temperature includes obtaining a set of measurements at different wavelengths.

4. The method of claim 1, further comprising, using the estimated color of the printed color sample at the second temperature as a basis for assessing operability of a color output device which printed the color sample.

5. The method of claim 4, wherein the assessing comprises real-time assessing of the output device.

6. The method of claim 1, further comprising:

computing an area coverage of the color sample, and wherein the estimating of the color of the printed color sample as printed on a second spectral sensor is based on the area coverage and the thermochromatic model.

7. The method of claim 6, wherein the area coverage is based on a halftone dot density of the color sample.

8. The method of claim 6, wherein the thermochromatic model comprises first and second matrices and the estimating of the color of the printed color sample includes applying the first matrix when the computed area coverage is below a predetermined threshold area coverage and applying the second matrix when the computed area coverage at meets the predetermined threshold area coverage.

9. The method of claim 6, wherein the thermochromatic model comprises a set of matrices, each matrix being assigned to an area coverage region and wherein the estimating of the color of the printed color sample includes identifying one of the area coverage regions based on the computed area coverage and applying the matrix assigned to that area coverage region.

10. The method of claim 6, wherein the thermochromatic model comprises at least one matrix, and the method includes computing a gain factor based on the area coverage and applying the gain factor to one of the at least one matrices.

11. The method of claim 1, wherein the model includes a plurality of matrices, each of the plurality of matrices representing relationships between measured colors of printed color samples on the in-line spectral sensor at the first temperature and a respective one of a set of reference spectral sensors at the second temperature, and the method further comprises identifying a reference sensor from the set of reference sensors and selecting a matrix based on the identified reference sensor.

12. The method of claim 1, wherein the thermochromatic model comprises a matrix which is generated by minimizing an objective function of the general form:

$$J = \arg \min_Q \sum_{i=1}^{N} w_i(\lambda) \|S_i(\lambda) - QR_i(\lambda)\|^2 \quad \text{(Eqn. 3)}$$

where Q represents the matrix,
N represents a number of measured colors,
$w_i(\lambda)$ represents an optional wavelength dependent weight,
$S_i(\lambda)$ represents vectors of the N cool spectral samples, and
$R_i(\lambda)$ represents corresponding vectors for the N hot spectral samples.

13. The method of claim 1, wherein the model accounts for the effect of a difference in print media between the in-line spectral sensor measurements and the reference spectral sensor measurements.

14. A computer program product encoding instructions, which when executed on a computer causes the computer to perform the method of claim 1.

15. A thermochromaticity compensation system comprising:
an in-line spectral sensor;
memory which stores a thermochromatic model which represents relationships between measured colors of printed color samples on the in-line spectral sensor at a first temperature and of a reference spectral sensor at a second temperature, the reference spectral sensor being a different type of sensor from the in-line spectral sensor such that a set of printed spot color samples generate different measured colors at the second temperature on the in-line spectral sensor from the reference spectral sensor; and
a processor which receives measured colors of a printed color sample from the in-line spectral sensor at a first temperature and, accesses the model to estimate a color of the printed color sample which would be output by the reference spectral sensor at a second temperature.

16. A color output device comprising the thermochromaticity correction system of claim 15 and a marking engine which prints the printed color sample.

17. An algorithmic method to compensate for thermochromaticity errors of in situ spectral color measurements of a color printing device comprising:
obtaining spectral measurements of a printed color generated by the color printing device measured at a first temperature by an in-line spectrophotometer and an off-line reference spectrophotometer at a second temperature;
generating a model which maps the difference between the spectral measurements of the printed color generated by the color printing device measured at a first temperature by an in-line spectrophotometer and the off-line reference spectrophotometer at the second temperature;
measuring a selected color corresponding to a color input signal representing a desired color at the second temperature, wherein the selected color is measured at the first temperature by the in-line spectrophotometer;
applying the model to convert the measured color to a corresponding color when the measured color changes to the second temperature, if measured on the off-line reference spectral sensor; and,
assessing whether the color is different from an expected color intended by the color input signal.

18. The method of claim 17, wherein the measuring comprises spectrophotometric measuring of just-fused prints by the in-line spectrophotometer in the color output device.

19. The method of claim 17, wherein the mapping comprises predetermining a thermochromaticity compensation matrix from empirical data including a set of sensor reflectance vectors.

20. The method of claim 17, wherein the assessing comprises calibrating the color output device by adjusting an input signal to the color output device corresponding to the measured in situ color in a manner wherein the in situ measuring of an output color corresponds to a desired output ambient color.

21. The method of claim 17, further comprising determining a temperature of the print output at the measured in situ color.

* * * * *